United States Patent [19]
Smarto

[11] Patent Number: 6,010,220
[45] Date of Patent: Jan. 4, 2000

[54] TAB AND BUS BAR APPLICATION METHOD

[75] Inventor: John E. Smarto, Trafford, Pa.

[73] Assignee: PPG Industries Ohio, Inc., Cleveland, Ohio

[21] Appl. No.: 09/046,385

[22] Filed: Mar. 23, 1998

[51] Int. Cl.[7] .............................. G02C 7/10; G02F 1/015
[52] U.S. Cl. ........................ 351/177; 351/159; 359/245
[58] Field of Search ................................ 351/159, 177; 359/245, 266

[56] References Cited

U.S. PATENT DOCUMENTS

| | | | |
|---|---|---|---|
| 3,630,603 | 12/1971 | Letter | 351/44 |
| 4,335,938 | 6/1982 | Giglia et al. | 359/270 |
| 4,978,208 | 12/1990 | Hsu et al. | 351/45 |
| 4,991,951 | 2/1991 | Mizuno et al. | 351/41 |
| 5,327,281 | 7/1994 | Cogan et al. | 359/270 |
| 5,471,036 | 11/1995 | Sperbeck | 359/512 |
| 5,520,851 | 5/1996 | Yu et al. | 252/518 |
| 5,618,390 | 4/1997 | Yu et al. | 204/192.26 |
| 5,657,150 | 8/1997 | Kallman et al. | 359/275 |

*Primary Examiner*—Scott J. Sugarman
*Attorney, Agent, or Firm*—William C. Mitchell

[57] ABSTRACT

A method for applying bus bar tab system to the peripheral edge region of a substrate such as an ophthalmic lens is disclosed. The method involves: 1) applying a curable conductive epoxy to said substrate so as to embed a tab into said curable conductive epoxy; and 2) curing said curable conductive epoxy. Related devices are also disclosed.

20 Claims, 2 Drawing Sheets

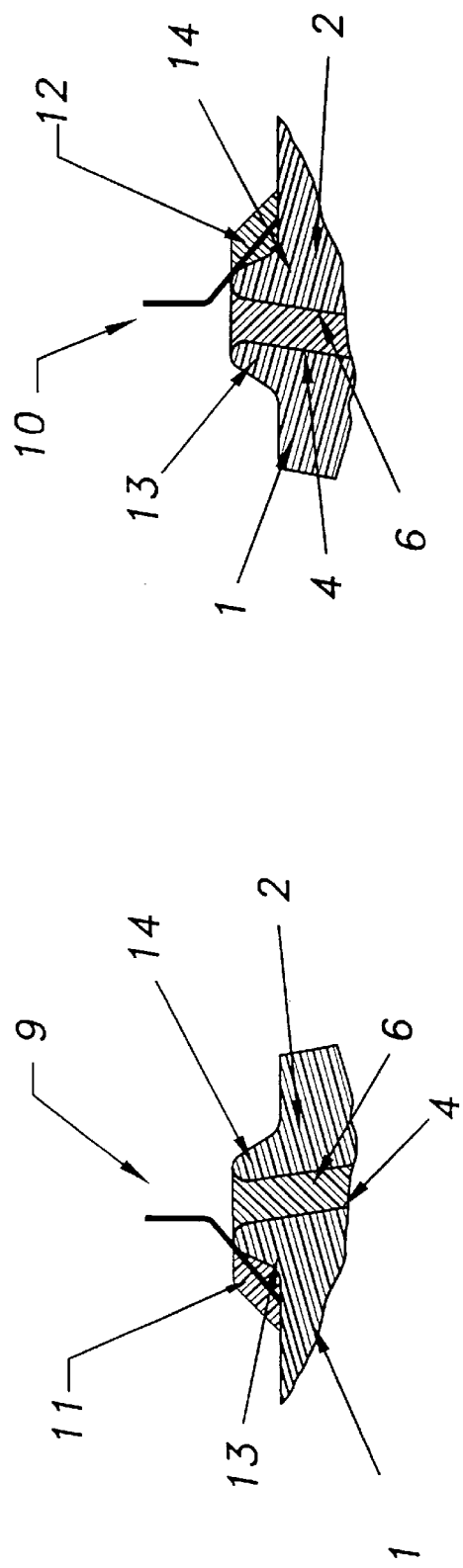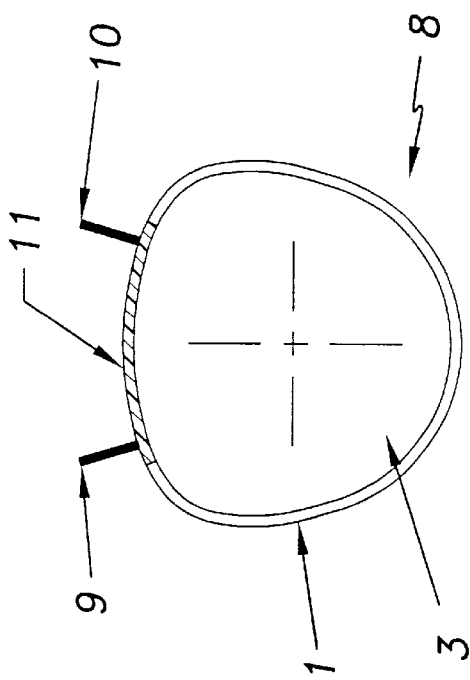

TAB AND BUS BAR APPLICATION METHOD

FIELD OF THE INVENTION

This invention relates to a method for applying a conductive epoxy-based electrical contact system to a substrate, and to the resulting metallized substrate. A preferred embodiment involves applying a conductive epoxy bus bar/tab system to an optical substrate, such as an ophthalmic lens. The instant method is particularly useful in preparing electrooptic devices, such as electrochromic lenses.

BACKGROUND OF THE ART

The transmittance properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device facilitates reversible oxidation and reduction reactions during optical switching.

Conventional electrochromic cells comprise at least one thin film of a persistent electrochromic material, i.e. a material responsive to the application of an electric field of a given polarity to change from a high-transmittance, non-absorbing state to a low-transmittance, absorbing or reflecting state. Since the degree of optical modulation is directly proportional to the current flow induced by an applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, at least one electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell. As voltage is applied across the electrodes, ions are conducted through the ion-conducting material.

When the electrode adjacent to the electrochromic film is the cathode, application of an electric field causes darkening of the film. Reversing the polarity causes reversal of the electrochromic properties, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate. A complimentary electrochromic film, for example an iridium oxide film, can also be used.

An electrochromic device, such as an electrochromic lens, also requires a means for delivering electrical current from a power source to each of its electrodes. This can be accomplished via use of a bus bar, as disclosed in U.S. Pat. Nos. 5,520,851 and 5,618,390 to Yu, et al.

U.S. Pat. No. 3,630,603 to Letter discloses an electrochromic eyewear control circuit. U.S. Pat. No. 4,991,951 to Mizuno discloses metal eyeglass frames used in conjunction with electrooptic lenses.

U.S. Pat. No. 4,335,938 to Giglia discloses electrochromic devices having a layer of tungsten oxide in contact with a layer of organic electrolyte resin comprising a hydrophilic layer of 2-acrylamido-2-methylpropanesulfonic acid homopolymer and an electrode means for changing electrochromic properties of the device.

U.S. Pat. No. 5,327,281 to Cogan discloses the use of epoxy to seal a cavity formed when a spacer is used to separate electrodes and contains a liquid electrolyte injected between the spaced electrodes.

U.S. Pat. No. 5,657,150 to Kallman, et al., discloses electrochromic devices and the use of contacts connecting first and second electrodes to flex circuits or other means of wiring.

SUMMARY OF THE INVENTION

This invention is directed to a method for applying bus bar/tab systems to various substrates and to the resulting metallized substrates. More particularly, this method involves applying a conductive epoxy bus bar and a tab to a substrate, said substrate having a peripheral edge region situated between first and second expanse surfaces, in a manner which provides reliable electrical contact between the tab and bus bar, and which allows the bus bar and tab to be used as electrical conduits between a power source and an electrode. For example, in electrooptic applications, a conductive epoxy bus bar is applied to the peripheral edge region of an optical substrate having or which will have an electroconductive film on an adjacent expanse surface. The conductive epoxy and electroconductive film are disposed so as to overlap at or near the interface of the peripheral edge region and the expanse surface. The connecting portion of a tab, preferably its connecting end, is embedded in the conductive epoxy. Curing of the epoxy firmly connects the tab to the epoxy bus bar, which, in conjunction with suitable circuitry, facilitates delivery of current from a power source through the tab and the conductive epoxy bus bar to the electroconductive film.

As used herein, the term 'bus bar' refers to a strip, coating or band of low resistance electrically conductive epoxy that is applied to a substrate. A bus bar is generally positioned so that it is in contact with or will contact an electroconductive material disposed on the substrate. Further, the term 'tab' refers to a conductive wire or strip which links or connects a bus bar to a power source through an electrical circuit, for example an electrooptic or electrochromic control circuit. A tab can either be an integral part or a separate component of such a circuit. A tab is generally affixed to a bus bar at a connecting end, though this invention contemplates tab connection along any portion of its surface.

A bus bar preferably is applied to the peripheral edge region of a substrate having or which will have a metal or metal oxide electroconductive film (e.g., fluorine-doped tin oxide, tin-doped indium oxide, antimony-doped tin oxide, aluminum-doped zinc oxide, etc.) on an adjacent expanse surface (hereinafter referred to as an electroconductive expanse surface). Electrical contact between the bus bar and an electroconductive film is preferably made at the interface of the peripheral edge region and an electroconductive expanse surface of a given substrate by causing the electroconductive film on the expanse surface to overlap the bus bar, or vice versa. It is desirable that a bus bar have a lower electrical resistance than the electroconductive film that it contacts. For example, bus bar sheet resistances of less than 20 ohms/sq. are preferred when electroconductive films having sheet resistances of 20–25 ohms/sq. are used.

In a preferred embodiment, a bus bar is applied to the peripheral edge region of a shaped substrate. As used herein, the term 'shaped substrate' refers to a substrate prepared by grinding or cutting the perimeter of an oversized blank substrate to a smaller size having a desired shape. This grinding process is commonly referred to as edging. For ophthalmic lenses, disk-shaped, oversized blank lenses are edged to shape via conventional techniques well known to skilled practitioners. The bus bar on such a shaped lens is usually confined to its peripheral edge region so that it is unobtrusive.

Bus bar dimensions are generally determined by resistance requirements and the shape of the electroconductive film that a given bus bar contacts. Thus, a bus bar can cover the full peripheral edge region of a substrate or it can be limited to some portion thereof. To avoid application of conductive epoxy beyond the targeted surface of a given substrate, the substrate can be mechanically masked so that only the desired bus bar target surface is exposed during bus bar application. It is also desirable that a bus bar adhere strongly to the substrate to which it is applied.

In a preferred embodiment involving applying a conductive epoxy bus bar/tab system to an ophthalmic lens, the edge region of a blank lens is first ground to shape via a conventional edging technique. A bus bar is then added by applying a curable conductive epoxy layer to the peripheral edge region of the shaped lens by a suitable application means, with masking as needed.

After or during application of the curable conductive epoxy layer to the bus bar target area of a given substrate, a tab is connected to the epoxy layer by embedding a portion of the tab, preferably a connecting end, in the epoxy layer. As used herein, the term 'embed' refers to placing, inserting or fixing a connecting portion of a tab in a conductive epoxy layer or between conductive epoxy layers so as to substantially surround the connecting portion of the tab with conductive epoxy. The tab can be embedded by various means, including inserting the connecting portion of the tab into a curable conductive epoxy layer prior to or during curing (i.e., while the epoxy is soft or pliable), placing the connecting portion of the tab onto an outer surface of an uncured, partially or fully cured conductive epoxy layer, and then placing additional curable conductive epoxy over the connecting portion, or placing the connecting portion of the tab onto the bus bar target area of the substrate, with or without the use of an attachment means (e.g., a structural epoxy, conductive epoxy or other adhesive) and then applying a curable conductive epoxy layer over the connecting portion of the tab. Curing of the conductive epoxy then secures the tab to the bus bar.

One embodiment of the electrical contact system of this invention is illustrated in the Figures. As shown in FIGS. 3 and 4, the connecting ends of tabs 9 and 10 are embedded in conductive epoxy bus bars 11 and 12, respectively, which in turn are positioned on the top peripheral edge regions of shaped front and rear lenses 1 and 2. Shaped Lenses 1 and 2 are laminated to form electrochromic lens 8, as shown in FIGS. 1 and 2.

BRIEF DESCRIPTION OF THE DRAWINGS

FIG. 2 is a front view of the laminated lens of FIG. 1 showing bus bar and tab orientation.

FIG. 3 is a cross-sectional blow-up of the front tab and bus bar of the lens shown in FIG. 1.

FIG. 4 is a cross-sectional blow-up of the rear tab and bus bar of the lens shown in FIG. 1.

DETAILED DESCRIPTION OF THE INVENTION

Figure 1:
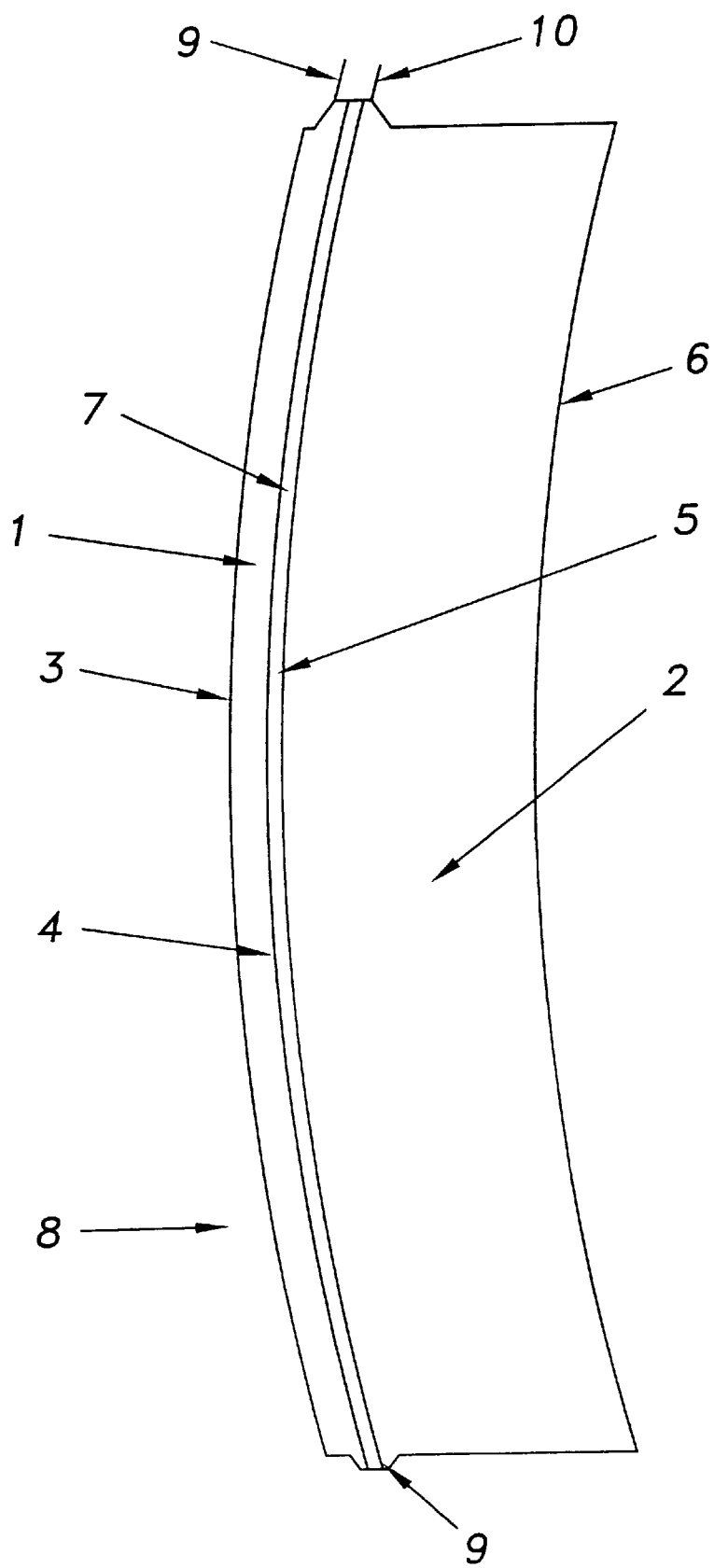
FIG. 1 is a side view of a laminated electrochromic lens showing front and rear lens tabs.

Other than in the operating Examples, or where otherwise indicated, all numbers quantifying ingredients, amounts, dimensions, ratios, ranges, reaction conditions, etc., used herein are to be understood as modified in all instances by the term 'about'.

In its broadest sense, the instant invention is directed to a method for applying or affixing a conductive epoxy bus bar/tab system to a substrate, said system comprising a cured conductive epoxy layer and a tab having a connecting portion or end, wherein said connecting portion or end is embedded in said cured conductive epoxy layer, which method comprises: a) embedding the connecting portion of said tab in a curable conductive epoxy layer applied to a bus bar target area on said substrate, preferably to a target area on the peripheral edge region of said substrate; and b) curing said curable conductive epoxy. This method connects a tab to a conductive epoxy bus bar positioned on a given substrate, thereby establishing electrical contact between the tab and bus bar. Preferably, a tab is affixed by embedding one of its ends, i.e., its connecting end, in a conductive epoxy bus bar.

In preferred embodiments of this method, the connecting end or portion of a tab is inserted into a curable (i.e., uncured or partially cured) conductive epoxy layer while the layer is pliable enough to allow insertion. Curing of the curable epoxy layer then secures the tab to the bus bar. Alternatively, the connecting end or portion of a tab is placed on a first conductive epoxy layer, said epoxy layer being in a curable (i.e., an uncured or partially cured) or cured state. Additional curable conductive epoxy (i.e., a second conductive epoxy layer) is then applied over the connecting end or portion of the tab, and all curable conductive epoxy layers are permitted to cure. These techniques embed the connecting end or portion of a tab in a single- or multi-layered conductive epoxy bus bar.

In another embodiment of the instant method, the connecting end or portion of a tab is placed on or affixed to the bus bar target area of a substrate, and a curable conductive epoxy layer is applied over the end or portion of the tab in contact with the substrate. Curing of the curable conductive epoxy layer establishes electrical contact between the tab and the resulting conductive epoxy bus bar. A structural epoxy, conductive epoxy or other adhesive, with appropriate curing, can be used to affix the tab to the substrate, if desired. In each of these embodiments, conductive epoxy embeds or substantially surrounds the connecting portion or end of a tab. Additional methods of embedding may become apparent to skilled artisans.

The instant invention is also directed to a substrate having a conductive epoxy bus bar and tab affixed thereto via any of the instant methods. Such substrates, which are preferably shaped substrates, can be used to prepare single stack electrooptic or electrochromic devices, wherein electrodes, electrochromic material(s) and possibly an ion-conducting material are coated as a stack on a first substrate which may or may not be laminated to a second substrate, and to prepare laminated electrooptic or electrochromic devices wherein first and second electrodes are coated on first and second substrates, respectively, each of which contains a bus bar. Multiple bus bars can be applied to a single substrate, if necessary. Preferred substrates are optical lenses; more preferred substrates are ophthalmic substrates.

Any curable conductive epoxy which adheres to and is compatible with the substrate being treated, which has workable cure characteristics (i.e., cure time, cure temperature, etc.) and which has suitable electrical conductivity properties can be used to form a conductive epoxy bus bar via the instant method. For example, commercially available silver epoxies, nickel epoxies, chromium epoxies, gold epoxies, tungsten epoxies, alloy epoxies and combinations thereof can be used as conductive epoxy bus bar materials. Preferred conductive epoxies are Tra-Duct® 2902 silver epoxy and Applied Technologies 5933 alloy epoxy, which are commercially available from Tra-Con, Inc., and Applied Technologies, respectively.

An effective amount of curable conductive epoxy is applied. This means that the curable conductive epoxy applied to a given substrate is of sufficient thickness and coverage to fully coat the bus bar target area of that substrate and to provide the desired resistivity. Conductive epoxy bus bars can be applied by any suitable means, for example, by brush, extrusion, roller, etc. Such coating means are well known to skilled practitioners. Preferred conductive epoxy bus bars are generally 2 to 50 mils thick, and extend around a substantial portion or all of the peripheral edge region to which they are applied.

The instant curable conductive epoxies usually comprise resin and harder components. These components are mixed prior to application in accordance with the relevant manufacturer's instructions. Curing is also preferably accomplished in accordance with manufacturer's instructions. Suitable conductive epoxies have cure times ranging from a few minutes to a few hours. An effective cure time is the time required for a given epoxy to cure to the extent that it becomes rigid enough to secure the connecting end or portion of a tab and develops sufficient electrical conductivity.

In a preferred embodiment, a curable conductive epoxy bus bar is applied to the peripheral edge region of a shaped substrate, i.e., a substrate which has been edged to shape using conventional edging/grinding techniques. The cross-sectional profile of the peripheral edge region to which a conductive epoxy bus bar is applied is not believed to be critical; the edge region profile can be, for example, flat, V-shaped, U-shaped, mesa shaped, square shaped, rounded or irregularly shaped. It is, however, desirable to avoid sharp edges in some applications, as they tend to concentrate stress. A particularly preferred embodiment requires that a blank substrate be edged to form a rounded or sloped transition zone between its peripheral edge region and its electroconductive expanse surface. Such a zone facilitates contact between an electroconductive film and a conductive epoxy bus bar.

After and/or during application of a curable conductive epoxy layer to a bus bar target area, a tab is embedded into the curable conductive epoxy. Tab location is not believed to be critical. Preferably, tabs are located so as to readily connect with corresponding circuitry. It is also preferred that the connecting end or portion of a tab be barbed, t-shaped, or otherwise irregularly shaped to help to secure the tab to the bus bar during the embedding step.

Any suitable wire or metal strip can be used as a tab. Preferably, a tab is sufficiently rigid to allow insertion into a pliable conductive epoxy layer, yet strong and pliable enough to be bent, shaped and/or connected to a circuit without breaking. Typical wire materials include, but are not limited to, nickel, silver, titanium, gold, platinum and copper. Such wires are commercially available from Aldrich, Inc., at 99.9% purity, by weight. Stainless steel tabs can also be used. Tab dimensions are not critical, and should be based on available space (e.g., the peripheral edge region width for a particular device) and resistance specifications. Generally, for electrochromic applications, wire resistances of less than about 2 $\Omega$ across a 2 inch (5 cm) length are desired. Tab thickness generally ranges between 0.5 and 5 mils. If strips are used instead of wires, widths between 20 and 50 mils are typical.

Though the instant tab/bus bar application method is applicable to virtually any substrate, the preferred substrates of the instant invention are glass or organic polymeric substrates conventionally used to prepare optical lenses or electrochromic articles or devices. Preferably, polymeric organic substrates are used. For optical applications, substrates of the present invention are preferably prepared from transparent materials suitable for producing eyewear lenses, such as lenses prepared from synthetic organic optical resins are suitable. Alternatively, the substrate can be a non-transparent solid material.

Suitable transparent lenses may have a conventional refractive index (1.48–1.5), a relatively high refractive index (1.60–1.75), or a mid-range refractive index (1.51–1.59), depending on the end use. In general terms, a transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol(allyl carbonate) monomer, especially diethylene glycol bis(allyl carbonate), which is sold as CR-39® monomer by PPG Industries, Inc. Copolymers of the aforedescribed monomers/resins may also be used as a lens material. These and other transparent and non-transparent polymeric substrates known in the art for use for various optical and non-optical applications may be used.

After bus bar and tab application, an electroconductive film is typically applied to the electroconductive expanse surface of the metallized substrate. This electroconductive film preferably overlaps the bus bar, thereby providing electrical contact. Tin-doped indium oxide films are preferred electroconductive films, particularly those having an indium to tin weight ratio of about 90:10.

Laminated electrochromic eyeglass lenses can be prepared by bonding first and second lenses together, wherein each lens comprises an edged, transparent substrate which contains an electroconductive film, a bus bar and a tab. An electrochromic film is present on at least one of the lenses. Bonding is preferably accomplished by placing an effective amount of a curable ion-conducting polymer (ICP) composition, i.e. a monomer solution comprising one or more monomers an effective amount of an initiator and optionally up to one or more non-reactive diluents and/or additives, on the concave interface surface of a matched lens pair and bringing this concave surface and the convex surface of the corresponding lens together, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow.

The best mode known to the inventors is now described by reference to the Figures. FIG. 1, which is not drawn to scale, shows a side view of laminated electrochromic lens 8 containing ion-conductive polymer (ICP) layer 7. In lens 8, shaped substrate 1 is the front lens of laminated electrochromic lens 8. Shaped substrate 1 has a front expanse surface 3 and an electroconductive expanse surface 4. The coatings on electroconductive expanse surface 4 are not shown; these are conventional electroconductive and electrochromic coatings used in the preparation of electrochromic lenses and are not critical to the instant invention. Laminated to shaped substrate 1 is shaped substrate 2, which is the rear lens. Shaped substrate 2 has an electroconductive expanse surface 5 and a rear expanse surface 6. The coatings on electroconductive expanse surface 5 are not shown; these are conventional electroconductive and electrochromic coatings used in the preparation of electrochromic lenses and are not critical to the instant invention. Ion-conducting polymer layer 7 is disposed between shaped substrates 1 and 2; this layer serves as both an ion-conducting electrolyte and a mechanical adhesive which bonds shaped substrates 1 and 2. Tabs 9 and 10 are affixed to the peripheral edge regions of shaped substrates 1 and 2, as shown in greater detail in FIGS. 2–4.

FIGS. 2, 3 and 4 are not drawn to scale. These figures show nubs 13 and 14 on the peripheral edge region of shaped substrates 1 and 2, respectively. Conductive epoxy bus bars 11 and 12 are positioned adjacent to nubs 13 or 14 on shaped substrates 1 and 2, respectively. The connecting end of tab 9 is embedded in bus bar 11 and the connecting end of tab 10 is embedded in bus bar 12. Tabs 9 and 10 can be situated anywhere on bus bars 11 and 12, but are generally located so as to enable convenient connection to related circuitry (not shown). Though edge shaping is not critical to the instant invention, nubs 13 and 14 represent preferred embodiments. These nubs are excellent bus bar foundations and can interlock with various edge seals.

EXAMPLES

The present invention is more particularly described in the following Examples, which are intended to be illustrative only since numerous modifications and variations therein will be apparent to those skilled in the art.

Example 1

Application of Conductive Epoxy Bus Bars to Blank Substrates

All conductive epoxies of this example were applied to 2"×2" 5 cm by 5 cm) cast flat substrates prepared from CR-39® monomer. Each conductive epoxy was formulated and cured per the manufacturer's instructions. Each bus bar was 2" 5 cm) long×⅛" 3 mm) wide×0.006" (0.15 mm) thick. These bus bars were applied via brush.

Conductivities were evaluated using a Fluke® 8060A multimeter which measured the resistance Ω across each 2" (5 cm) bus bar tested using standard contact probes. Five (5) different conductive epoxies were evaluated, including:
1. Tra-Duct® 2902 silver epoxy;
2. Tra-Duct® 2701 nickel epoxy;
3. Applied technologies gold epoxy;
4. Applied Technologies 5933 alloy epoxy; and
5. Applied Technologies tungsten epoxy.

Resistances were measured under the following conditions:
1. Initial bus bar resistance (Ri);
2. Cyclic humidity resistance ($R_{H1-5}$);

Protocol:
  a) Room temperature for 8 hrs.;
  b) 50° C., 100% relative humidity for 16 hours;
  c) Measure resistance; and
  d) Repeat steps a) through c) four times.
3. Resistance after 70° C. soak for 24 hrs.
4. Resistance after hydrothermal shock.
  Protocol:
  a) 60° C. water immersion for 6 min.;
  b) 0° C. water immersion for 6 min.;
  c) Repeat steps a) and b) twice; and
  d) Measure resistance.
5. Sweat Immersion Resistance.
  Protocol:
  a) Immerse bus bars in synthetic sweat (1%-NaCl, 0.1% $Na_2HPO_4$, 0.1% lactic acid, in water);
  b) Spurge air in solution for 16 hrs.; and
  c) Measure resistance.

Initial and relative humidity resistances are shown in Table 1.

TABLE 1

Initial and Humidity Resistances (Ω)

| Sample | Ri | $R_{H1}$ | $R_{H2}$ | $R_{H3}$ | $R_{H4}$ | $R_{H5}$ |
|---|---|---|---|---|---|---|
| Silver epoxy Tra-Duct® 2902[1] | 3.2 | 4.3 | 4.7 | 4.5 | 3.9 | 3.9 |
| Nickel Epoxy Tra-Duct® 2701[1] | 20.0 | 14.0 | Flaked Off | | | |
| Gold Epoxy[2] Applied Technologies® | 8.6 | 7.9 | 2.8 | 3.2 | 1.5 | Flaked Off |
| Alloy Epoxy[2,3] Applied Technologies® 5933-70/25/5 | 1.5 | 1.5 | 1.3 | 0.9 | 0.7 | 0.8 |
| Tungsten Epoxy[2] Applied Technologies® | 5.5 | 1,800,000 | 2,200,000 | Flaked Off | | |

[1]Tra-Duct® 2902 and Tra-Duct® 2701 are commercially available from Tra-Con, Inc.
[2]Gold, alloy and tungsten epoxies are commercially available from Applied Technologies, Inc.
[3]Alloy epoxy is 70/25/5 weight percent Ag/Au/Ni.

After completion of the humidity cycling test, only Tra-Duct 2902 silver and Applied Technologies 5933 alloy epoxies did not flake. All the other bus bars flaked off of the substrates. These two epoxy bus bars were then compared in the remaining environmental tests. Results are shown in Table 2.

TABLE 2

Heat soak, Thermal Shock, and Sweat Immersion Resistances of Bus Bars

| Sample | Ri (Ω) | Heat Soak | Thermal Shock | Sweat Immersion |
|---|---|---|---|---|
| Silver Epoxy Tra-Duct® 2902 | 3.2 | 4.3 | 4.5 | 3.9 |

TABLE 2-continued

Heat soak, Thermal Shock, and
Sweat Immersion Resistances of Bus Bars

| Sample | Ri (Ω) | Heat Soak | Thermal Shock | Sweat Immersion |
|---|---|---|---|---|
| Alloy Epoxy Applied Technologies ® 5933-70/25/5 | 1.5 | 0.7 | 0.8 | 0.8 |

Table 2 shows that the alloy epoxy bus bar had the lowest resistance throughout the tests. This epoxy was not substantially affected by temperature changes or by exposure to moisture. Also, the alloy epoxy was found to bond extremely well to CR-39® substrate. However the alloy epoxy was time consuming to mix and had a pot life of about 5 minutes.

Example 2

Tab Resistance Tests

Resistances of silver, nickel, titanium, gold, copper and platinum wire tabs were evaluated. Each tab tested was 2" (5 cm) long and 0.01271" (0.3 mm) in diameter. Purities were 99.9% by weight. These tabs were purchased from Aldrich, Inc. Initial resistance was measured, as was the resistance after 100 hours at 50° C. and 100% relative humidity, using a Fluke® 8060A multimeter. Results are shown in Table 3.

TABLE 3

Tab Resistance

| Sample | Ri (Ω) | Humidity Resistance (Ω) |
|---|---|---|
| Silver | 0.3 | 1.4 |
| Nickel | 0.6 | 0.7 |
| Titanium | 8.4 | 9.9 |
| Gold | 0.4 | 0.4 |
| Copper | 0.2 | 0.7 |
| Platinum | 1.1 | 1.1 |

Table 3 shows that the nickel wire had good conductivity and environmental durability. The copper wire developed an oxide layer on its surface during the humidity test; this could be a serious flaw in some applications, as an oxide layer could change wire resistance.

Example 3

Mechanical Durability

The relative mechanical durability of each wire of Example 2 was tested by tapping one end of the wire to a V groove bevel on the peripheral edge region of a 1 mm thick ophthalmic lens prepared from CR-39® monomer. The wire was then stretched along the peripheral V groove, and its other end was taped. After securing each wire end with tape, the 1" middle portion of the wire was covered with Applied Technologies 5933 alloy epoxy. After curing for 30 min. at 50° C., the tape was removed and one end of the wire was pulled. This resulted in either failure of the wire or failure of the epoxy, as shown in Table 4.

TABLE 4

Mechanical Durability

| Sample | Mechanical Durability |
|---|---|
| Silver | Wire Failed |
| Nickel | Epoxy Failed |
| Titanium | Epoxy Failed |
| Gold | Wire Failed |
| Copper | Epoxy Failed |
| Platinum | Wire Failed |

We claim:

1. A method for applying a conductive epoxy bus bar/tab system to a substrate, said system comprising a cured conductive epoxy layer and a tab having a connecting portion embedded in said cured conductive epoxy layer, which method comprises: a) embedding the connecting portion of said tab in a curable conductive epoxy layer applied to a bus bar target area on said substrate; and b) curing said curable conductive epoxy.

2. The method of claim 1, wherein embedding occurs by inserting the connecting portion of said tab into a curable conductive epoxy layer applied to said substrate, and curing said curable conductive epoxy layer.

3. The method of claim 1, wherein embedding occurs by placing the connecting portion of said tab on a first cured or curable conductive epoxy layer applied to said substrate, applying a second curable conductive epoxy layer over said connecting portion, and curing all curable conductive epoxy layers.

4. The method of claim 1, wherein embedding occurs by placing or affixing the connecting portion of said tab on the bus bar target area of said substrate, applying a curable conductive epoxy layer over said connecting portion, and curing said curable conductive epoxy layer.

5. The method of claim 1, wherein said substrate has a peripheral edge region between first and second expanse surfaces, and said bus bar target area is on said peripheral edge region.

6. The method of claim 5, wherein said substrate is a shaped substrate.

7. The method of claim 6, wherein said substrate is an ophthalmic lens.

8. The method of claim 1, wherein said bus bar contacts an electroconductive film on said substrate.

9. The method of claim 5, wherein said bus bar contacts an electroconductive film on said substrate.

10. The method of claim 6, wherein said bus bar contacts an electroconductive film on said substrate.

11. The method of claim 1, wherein said connecting portion is a connecting end.

12. The method of claim 5, wherein said connecting portion is a connecting end.

13. A substrate containing a conductive epoxy bus bar having a tab embedded therein.

14. The substrate of claim 13, wherein said bus bar contacts an electroconductive film on said substrate.

15. The substrate of claim 14, wherein said bus bar is positioned on the peripheral edge region of said substrate and said electroconductive film is positioned on an adjacent expanse surface.

16. A substrate having a conductive epoxy bus bar/tab system applied by the method of claim 1.

17. The substrate of claim 13, wherein said substrate is an ophthalmic lens.

18. The substrate of claim 14, wherein said substrate is an ophthalmic lens.

19. The substrate of claim is, wherein said substrate is an ophthalmic lens.

20. The substrate of claim 16, wherein said substrate is an ophthalmic lens.

* * * * *